United States Patent
Aitken et al.

(10) Patent No.: US 9,457,650 B2
(45) Date of Patent: Oct. 4, 2016

(54) DRAIN SLOT FOR CAPLESS FUEL FILLER INSERT

(75) Inventors: Brian T. Aitken, Livonia, MI (US); Paul Chretien, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 898 days.

(21) Appl. No.: 13/596,172

(22) Filed: Aug. 28, 2012

(65) Prior Publication Data

US 2014/0061192 A1    Mar. 6, 2014

(51) Int. Cl.
B60K 15/05    (2006.01)

(52) U.S. Cl.
CPC ....... B60K 15/05 (2013.01); *B60K 2015/0553* (2013.01)

(58) Field of Classification Search
CPC .............. B60K 15/04; B60K 15/0406; B60K 15/0458
USPC ......... 141/86, 312, 348, 349, 350; 220/86.2; 137/312
See application file for complete search history.

(56) References Cited

U.S. PATENT DOCUMENTS

| | | | |
|---|---|---|---|
| 4,248,279 A * | 2/1981 | Warmbold | 141/348 |
| 5,056,570 A * | 10/1991 | Harris et al. | 141/59 |
| 5,071,018 A * | 12/1991 | Moore | 220/86.2 |
| 5,271,438 A | 12/1993 | Griffin et al. | |
| D360,612 S * | 7/1995 | Whitley, II | D12/317 |
| 5,538,055 A * | 7/1996 | Kunz et al. | 141/312 |
| 6,374,868 B1 | 4/2002 | Channing | |
| 6,446,826 B1 | 9/2002 | Foltz et al. | |
| 6,539,990 B1 * | 4/2003 | Levey et al. | 141/301 |
| 6,880,586 B2 | 4/2005 | Crowley et al. | |
| 6,968,874 B1 * | 11/2005 | Gabbey et al. | 141/349 |
| 7,621,303 B2 * | 11/2009 | Buchgraber | 141/350 |
| 7,661,550 B2 * | 2/2010 | Feichtinger | 220/86.2 |
| 7,789,113 B2 * | 9/2010 | Stephan et al. | 141/350 |
| 7,926,522 B2 | 4/2011 | Aitken et al. | |
| 7,950,425 B2 * | 5/2011 | Och | 141/367 |
| 8,191,588 B2 * | 6/2012 | Hagano | 141/350 |
| 8,215,333 B2 * | 7/2012 | Stokes | B60K 15/04 137/312 |
| 2005/0082445 A1 * | 4/2005 | Groves | B66C 23/48 248/188.2 |
| 2008/0087354 A1 * | 4/2008 | Cisternino et al. | 141/350 |
| 2009/0145899 A1 * | 6/2009 | Benjey et al. | 220/86.2 |
| 2011/0079322 A1 * | 4/2011 | Beier et al. | 141/350 |

* cited by examiner

Primary Examiner — Timothy L Maust
(74) Attorney, Agent, or Firm — Jason Rogers; MacMillan, Sobanski & Todd, LLC

(57) ABSTRACT

A motor vehicle includes a fuel-filler housing component for mounting to a vehicle body and an insert at a terminus of the fuel filler pipe. The housing component has a central opening and at least one on-center vertical plumb feature. The insert is mounted to the fuel filler pipe so that it is disposed in the central opening. The insert includes an annular mouth with a hole for receiving a fuel transfer nozzle, wherein the annular mouth includes a drain slot for draining liquid away from the hole. The drain slot is substantially aligned with the on-center vertical plumb feature and has a teardrop profile substantially free of visible straight lines pointing toward the on-center vertical plumb feature. Thus, any small misalignment of the insert remains relatively undetectable since visual cues are minimized.

16 Claims, 5 Drawing Sheets

DRAIN SLOT FOR CAPLESS FUEL FILLER INSERT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to capless fuel filler inserts, and, more specifically, to a drain slot configuration for draining liquids away from the opening for receiving a refueling nozzle.

The assembly of a motor vehicle is a complex operation in which large numbers of parts must be fit together, all having a proper alignment and orientation with respect to each other. Intricate assembly processes and equipment are developed to meet the required tolerances. In general, tighter tolerances achieving greater control of part dimensions and relative final placements in the assembled product result in higher costs due to additional processing or specialized equipment requirements.

One particular area requiring accurate control of the positioning of components with tight tolerances relates to the interfacing of a fuel filler door with a fuel tank system. A fuel filler door and housing are typically mounted to a vehicle body, while a fuel tank and a fuel filler pipe leading to the fuel filler door are mounted to a vehicle frame. The neck of the filler pipe may include an insert as shown in U.S. Pat. No. 6,374,868, or as employed in the Ford EASY FUEL™ Capless Fuel Filler System. The primary attachment of the insert is to the filler pipe, but it also attaches to the filler door housing. A successful assembly operation depends upon the housing and insert being properly aligned during installation.

Obtaining a proper fit and finish in the assembly operation is important both in terms of the proper functioning of components and the visual appearance to the customer. In some instances, visual appearance may impose an even greater positional accuracy than the functional requirements whenever poor alignment can be perceived as a lack of product quality. In the case of a fuel pipe insert, a common feature on the insert is a drain slot positioned directly below the fuel filler hole (i.e., at a 6 o'clock position) for draining liquid such as melted snow away from the filler hole. The fuel door housing may also contain features at a 6 o'clock or a 12 o'clock position, thereby establishing a vertical alignment of multiple features. In the event that the fuel insert is rotationally misaligned on the fuel pipe, even a relatively small misalignment can be easily seen and may cause a perception of lowered quality.

SUMMARY OF THE INVENTION

In one aspect of the invention, an apparatus comprises a fuel-filler housing component for mounting to a vehicle body, wherein the housing component has a central opening and at least one on-center vertical plumb feature. An insert is provided for mounting to a fuel filler pipe of a fuel tank so that it is disposed in the central opening. The insert includes an annular mouth with a hole for receiving a fuel transfer nozzle, wherein the annular mouth includes a drain slot for draining liquid away from the hole. The drain slot is substantially aligned with the on-center vertical plumb feature and has a teardrop profile substantially free of visible straight lines pointing toward the on-center vertical plumb feature.

DETAILED DESCRIPTION OF PREFERRED EMBODIMENTS

Figure 1:
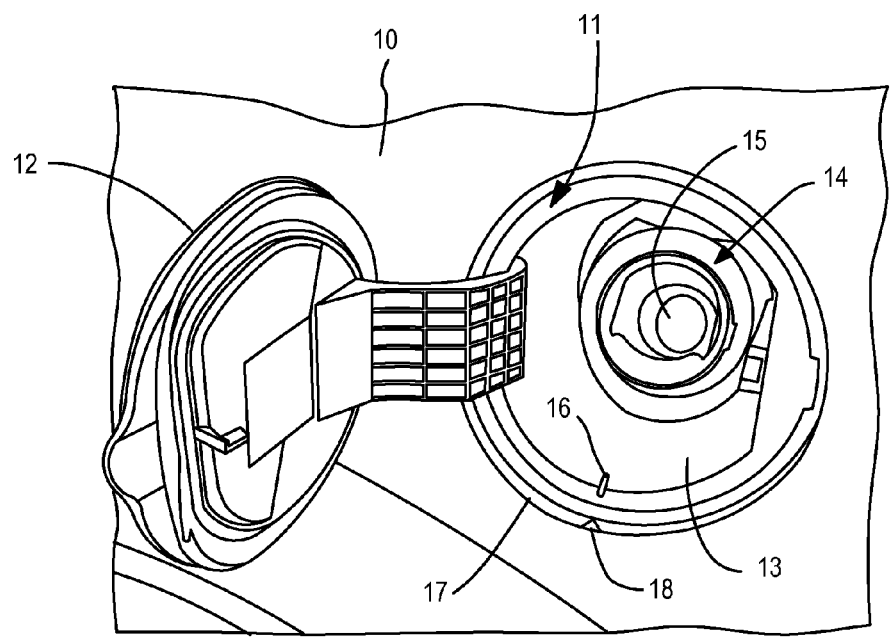
FIG. 1 is a perspective view of a conventional capless refueling apparatus.

Referring now to FIG. 1, a vehicle body side panel 10 supports a fuel-filler housing component 11 with a fuel door 12. Housing component 11 includes a recess 13 which receives an insert 14. A self-sealing opening 15 of insert 14 is adapted to receive a fuel transfer nozzle when filling fuel into a vehicle.

Housing component 11 includes one or more on-center vertical plumb features such as a drain slot 16 or an expansion notch 18 in a sealing gasket 17. These on-center vertical plumb features are preferably located at a 6 o'clock vertical position (i.e., the lowest position) in the corresponding structures since liquids drain at such a location, whereby they are efficiently removed via a drain slot. For a gasket relief slot, ingress of liquids is less likely that the lowest position.

Figure 2:
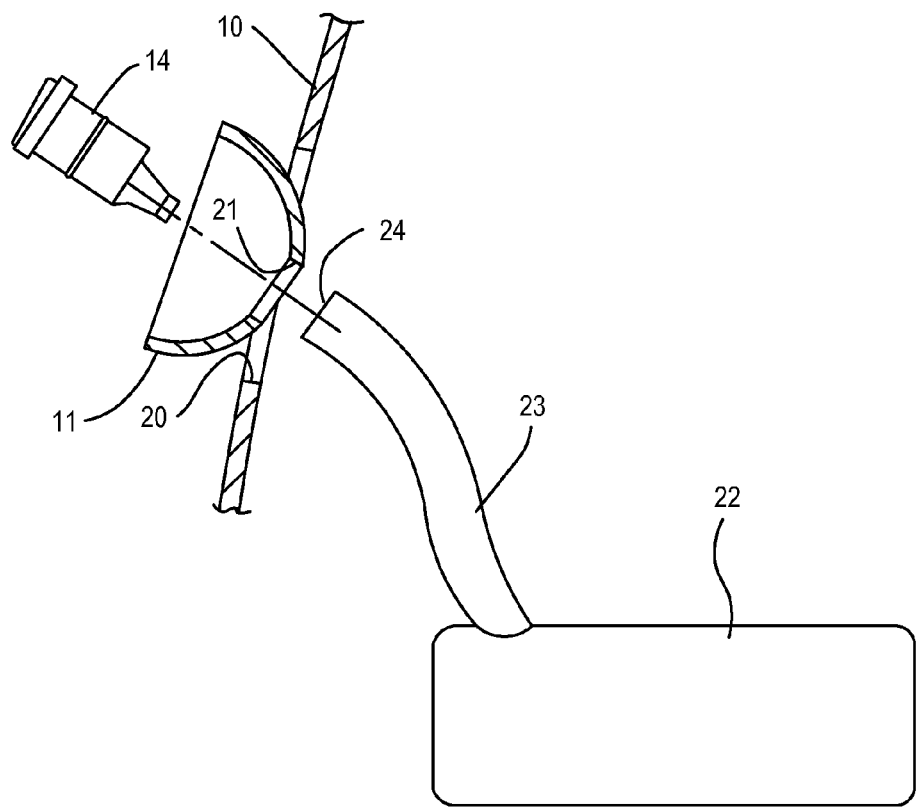
FIG. 2 is a side cross-sectional and schematic view of a fuel system with a fuel filling insert.

As shown in FIG. 2, body panel 10 has an opening 20 for receiving housing component 11. An opening 21 in housing component 11 resides at a location determined by the mounting of housing component 11 on body panel 10. A fuel tank 22 is mounted on a different structure of the vehicle and has a fuel filler pipe 23 with a neck 24 for receiving insert 14. The location of neck 24 depends on the specific shape of filler pipe 23 and how it is mounted to other structure within the vehicle. When installed, insert 14 must be properly aligned with hole 21 in housing component 11 and must have a desired rotational orientation.

Figure 3:
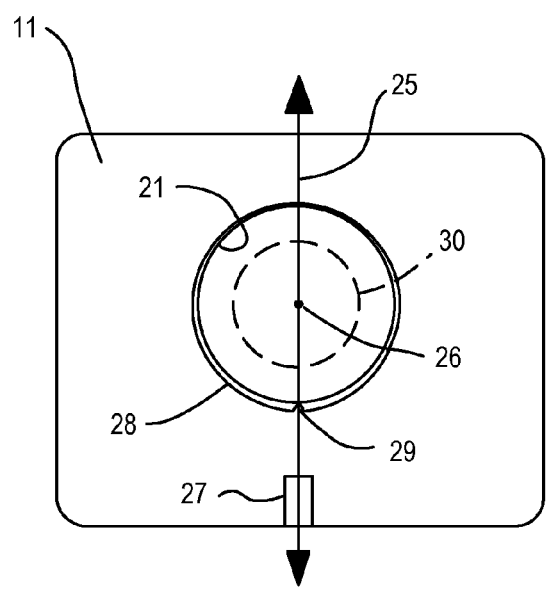
FIG. 3 is a front, plan view showing a spatial relationship between elements of a capless refueling apparatus.

As shown in FIG. 3, housing component hole 21 defines an on-center vertical plumb line 25 through its center 26. Also on the on-center vertical plumb line 25 lie a drain slot 27 and an expansion/contraction relief slot 29 in a gasket 28. The placement of such features along vertical plumb line 25 (and/or the vertical straight line segments such as the edges of drain slot 27) create a visual appearance in which the vertical plumb line is strongly sensed. Dashed line 30 represents the desired position of the insert which should have its center coincident with center 26 and for which any vertically positioned features need to fall on vertical plumb line 25 in order to avoid the appearance of a defect.

Figure 5:
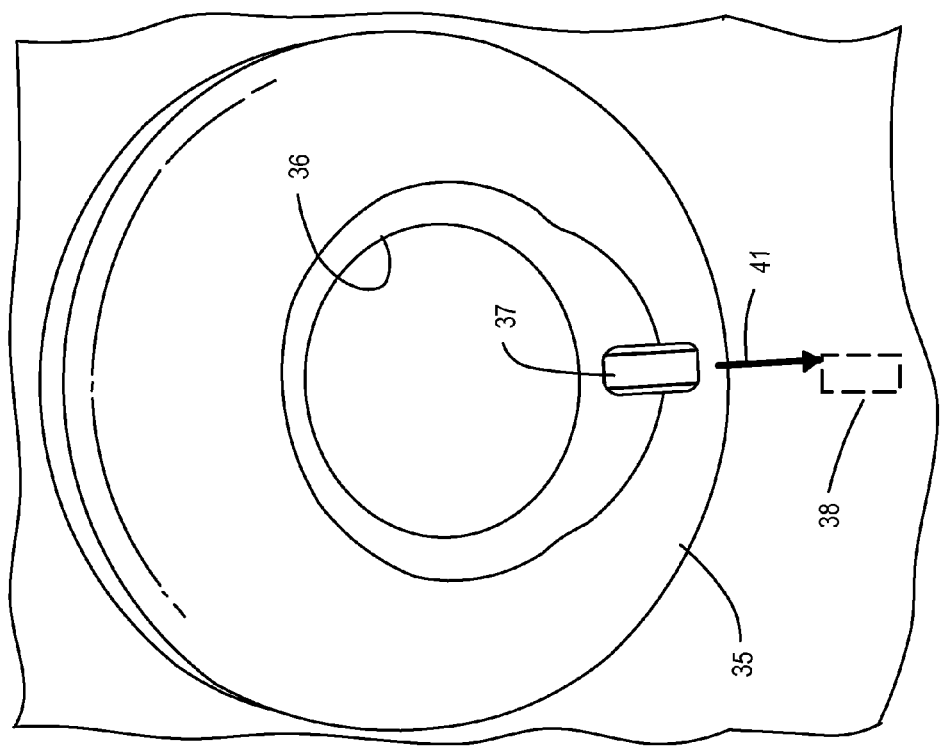
FIGS. 4 and 5 are front plan views of a conventional insert in aligned and misaligned installations, respectively.
Figure 4:
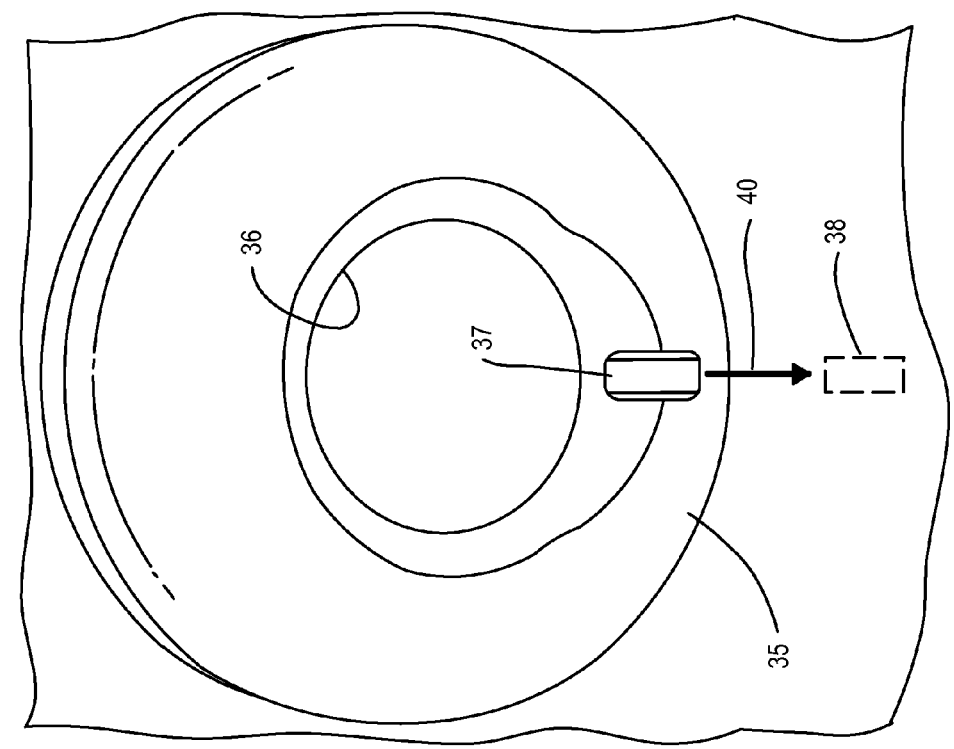

FIGS. 4 and 5 illustrate a face plate 35 of an insert assembly installed at different rotational angles. An annular mouth 36 in face plate 35 provides a hole for receiving the fuel transfer nozzle. The annular mouth includes a drain slot 37 formed as a vertically sloping slot with straight vertical edges on both sides. When installed correctly, the side edges of drain slot 37 point straight down toward another on-center vertical plumb feature 38 such as a housing drain slot as indicated by vertically straight arrow 40. When the insert is not installed in the steel filler pipe at the correct angle, the discrepancy may be very obvious to the vehicle owner. Without excessive cost and effort, it is very difficult to control the angular position to within better than a few angular degrees. FIG. 5 shows insert face plate 35 installed at an angle about 3° from vertical. The straightly edged sides of slot 37 appear distinctly crooked in view of the proximity to plumb feature 38, as demonstrated by skewed drain slot axis 41. The perceived defect may generate customer complaints or lead to feelings of poor quality even though functional performance is unaffected.

Figure 7:
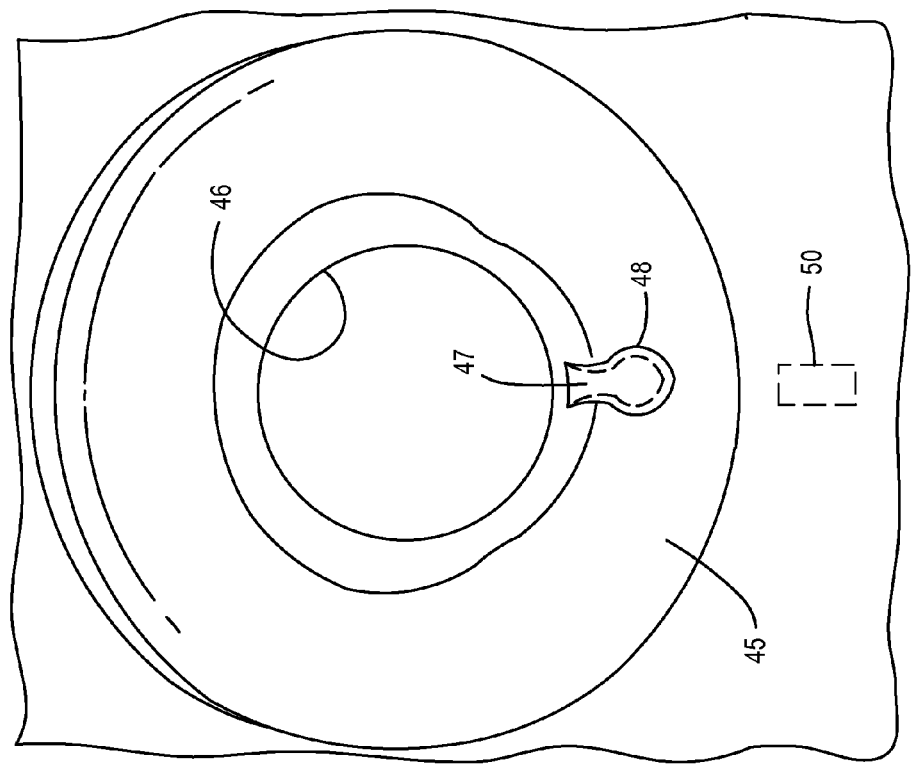
FIGS. 6 and 7 are front plan views of one preferred embodiment of an insert of the present invention in aligned and misaligned installations, respectively.
Figure 6:
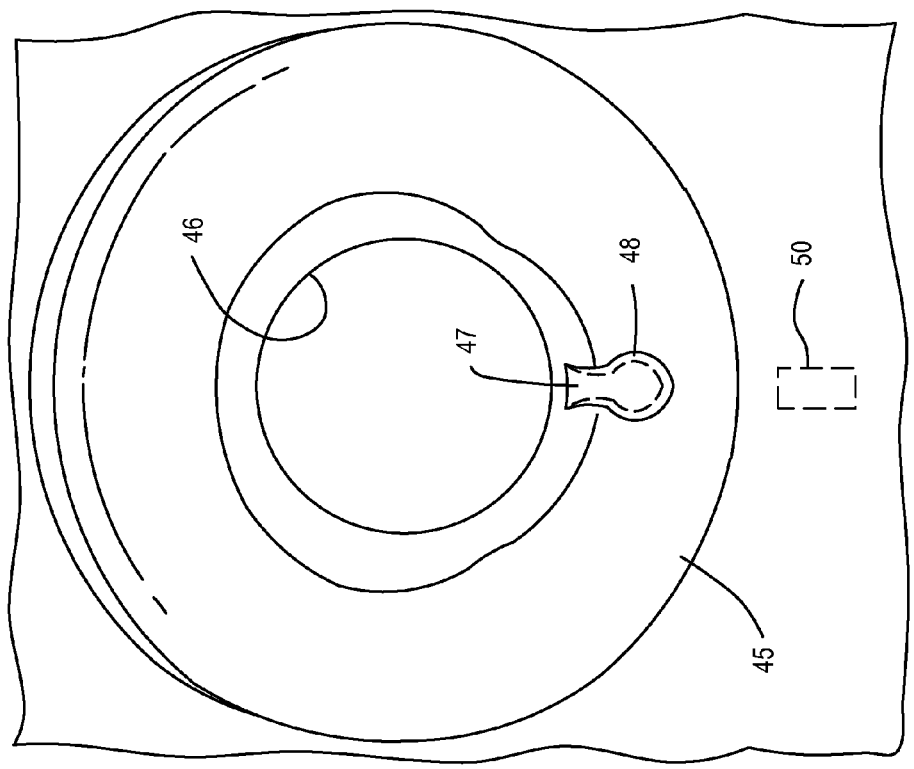

As shown in one preferred embodiment of the invention in FIGS. 6 and 7, a teardrop profile for the drain slot which is substantially free of visible straight lines extending radially on the insert manages to avoid visual cues that would highlight any differences in rotational position. Thus, an insert faceplate 45 with an annular mouth and central nozzle-receiving hole 46 has a drain slot 47 substantially aligned with an on-center vertical plumb feature 50 employing a teardrop shaped profile 48. FIG. 7 shows front plate 45 rotated by 3° with respect to the position of vertical plumb feature 50, but by virtue of teardrop profile 48 the difference is barely perceptible.

Figure 8:
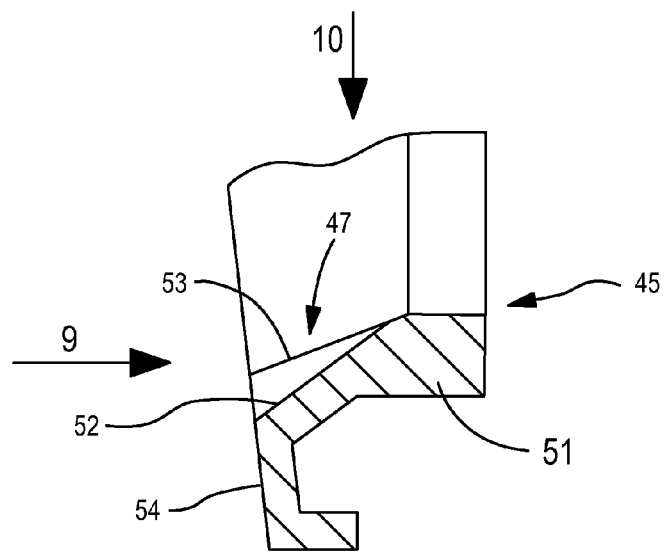
FIG. 8 is a side cross-sectional view of a portion of an insert through the drain slot.
Figure 9:
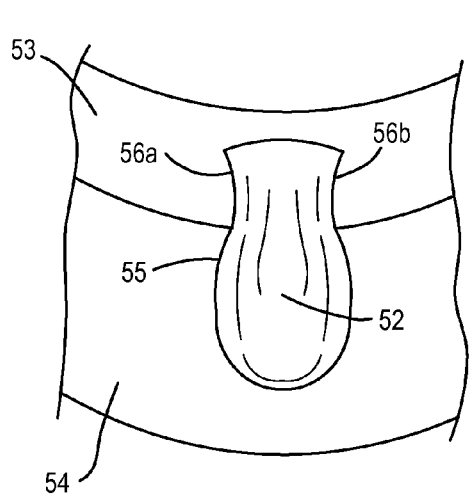
FIG. 9 is a front view of the drain slot as indicated in FIG. 8.
Figure 10:
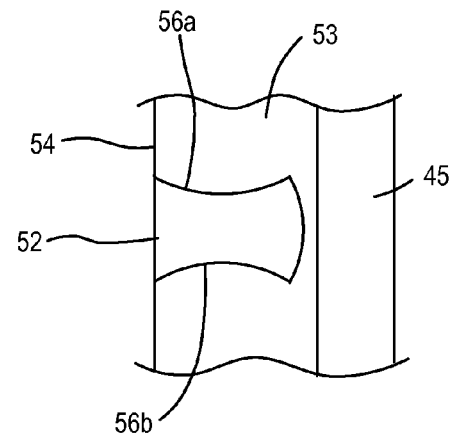
FIG. 10 is a top view of the drain slot as indicated in FIG. 8.

FIG. 8 shows a cross-section through insert faceplate 45 with annular mouth section 51. Drain slot 47 has a sloped bottom 52 formed in an upward facing surface 53. Surface 53 may also be slightly sloped to facilitate insertion of the fuel transfer nozzle. Insert 45 has a forward facing surface 54 which is also broken by drain slot 47. As seen in FIG. 9, the teardrop profile includes a forward-facing edge profile 55 on forward facing surface 54 which is comprised of a continuous arc which is open at its top. The specific radius of curvature and various diameters across the arc can assume any desired values, provided that any straight line cues that would highlight any misalignment are avoided. Upward facing surface 53 receives an upward-facing edge profile 56 of drain slot 47 which includes a pair of complementary arcs 56A and 56B disposed on opposite sides of drain slot 47.

The edge profiles disclosed in the present invention are exemplary only. As used herein, teardrop means any profile of a drain slot with a curved bottom and upper side edges that are substantially devoid of straight lines pointing radially outward from the fuel insert. Preferably, the upper side edges include substantially continuous arcs. The arcs (whether on the forward-facing edge or the upward-facing edge) can be concave or convex, single or multiple, fixed radius (circular) or variable radius (noncircular), and left-right symmetrical or nonsymmetrical. As seen from outside the fuel-filler housing component, each teardrop profile avoids straight line cues while still meeting the requirements of providing an effective drain path for liquids.

Figure 11:
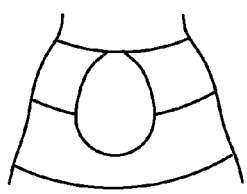
FIGS. 11-15 illustrate additional teardrop profiles within the scope of the invention.
Figure 12:

Each of the teardrop profiles in FIGS. 11-15 is left-right symmetrical, which look more natural than nonsymmetrical profiles would look. FIG. 11 shows a single convex arc for each side edge, while FIG. 12 shows a single concave arc.

Figure 13:
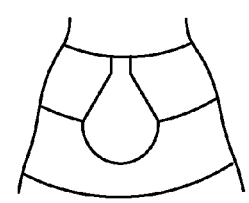
Figure 14:
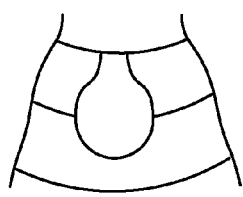
Figure 15:
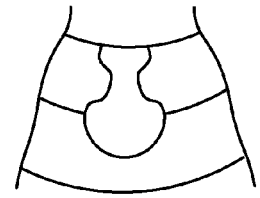

As shown in FIG. 13, the side edges can also include one or more straight portions as long as the straight portions are not parallel to a radially outward line that would create the visual impression of an intended alignment. Since along most of their length the side edges in FIG. 13 are widening (i.e., not parallel), the benefits of the invention are still obtained even with side edges composed of straight segments. FIGS. 14 and 15 illustrate teardrop profiles with each side edge comprised of compound arcs. In FIG. 14, each side edge has one convex and one concave segment. In FIG. 15, each side edge has a concave segment between two convex segments. In each profile, the arc-shaped drain bottom completes the teardrop.

By avoiding the use of straight-line, radial cues in the visual appearance of the drain slot, the present invention allows a relaxation in the tolerances that control the positioning of the drain slot, thereby reducing costs while achieving a higher level of perceived quality.

What is claimed is:

1. Vehicle apparatus comprising:
   a fuel-filler housing component for mounting to a vehicle body, wherein the housing component has a central opening and at least one on-center vertical plumb feature;
   an insert for mounting to a fuel filler pipe of a fuel tank so that the insert is disposed in the central opening, the insert including an annular mouth with a hole for receiving a fuel transfer nozzle, wherein the annular mouth includes a drain slot for draining liquid away from the hole, wherein the drain slot is substantially aligned with the on-center vertical plumb feature, wherein the mounting of the insert to the fuel filler pipe determines a rotational alignment of the drain slot within the central opening, and wherein the drain slot has a teardrop profile substantially free of visible straight lines pointing toward the on-center vertical plumb feature.

2. The vehicle apparatus of claim 1 wherein the drain slot has a sloped bottom.

3. The vehicle apparatus of claim 1 wherein the drain slot has a forward-facing edge profile comprised of a continuous arc which is open at the top of the continuous arc.

4. The vehicle apparatus of claim 1 wherein the drain slot has an upward-facing edge profile comprised of a pair of complementary arcs disposed on opposite sides of the drain slot.

5. The vehicle apparatus of claim 1 wherein the on-center vertical plumb feature is comprised of a gasket relief slot.

6. The vehicle apparatus of claim 1 wherein the on-center vertical plumb feature is comprised of a housing drain.

7. Vehicle apparatus comprising:
   an exterior body panel;
   a fuel-filler housing component mounted on the exterior panel, wherein the housing component has a central opening and at least one on-center vertical plumb feature;
   a fuel tank;
   a fuel filler pipe connected to the fuel tank; and
   an insert mounted to an end of the fuel filler pipe remote from the fuel tank, the insert being disposed in the central opening and including an annular mouth with a hole for receiving a fuel transfer nozzle, wherein the annular mouth includes a drain slot for draining liquid away from the hole, wherein the drain slot is substantially aligned with the on-center vertical plumb feature, wherein the mounting of the insert to the fuel filler pipe determines a rotational alignment of the drain slot within the central opening, and wherein the drain slot has a teardrop profile substantially free of visible straight lines pointing toward the on-center vertical plumb feature.

8. The vehicle apparatus of claim 7 wherein the drain slot has a sloped bottom.

9. The vehicle apparatus of claim 7 wherein the drain slot has a forward-facing edge profile comprised of a continuous arc which is open at the top of the continuous arc.

10. The vehicle apparatus of claim 7 wherein the drain slot has an upward-facing edge profile comprised of a pair of complementary arcs disposed on opposite sides of the drain slot.

11. The vehicle apparatus of claim 7 wherein the on-center vertical plumb feature is comprised of a gasket relief slot.

12. The vehicle apparatus of claim 7 wherein the on-center vertical plumb feature is comprised of a housing drain.

13. Vehicle refueling apparatus comprising:
a refueling housing having a refueling door and an on-center vertical plumb feature;
an insert rotationally aligned in the housing by attachment to a tank filler pipe, the insert including a mouth for receiving a nozzle, wherein the mouth includes a slot for draining liquid away from the mouth, wherein the slot has a teardrop profile substantially free of visible straight lines pointing toward the plumb feature.

14. The apparatus of claim 13 wherein the slot has a sloped bottom.

15. The apparatus of claim 13 wherein the slot has a forward-facing edge profile comprised of a continuous arc which is open at the top of the continuous arc.

16. The apparatus of claim 13 wherein the slot has an upward-facing edge profile comprised of a pair of complementary arcs disposed on opposite sides of the slot.

* * * * *